Oct. 5, 1965 J. D. KIRSCHMANN 3,209,609
TRANSMISSION
Filed June 25, 1963
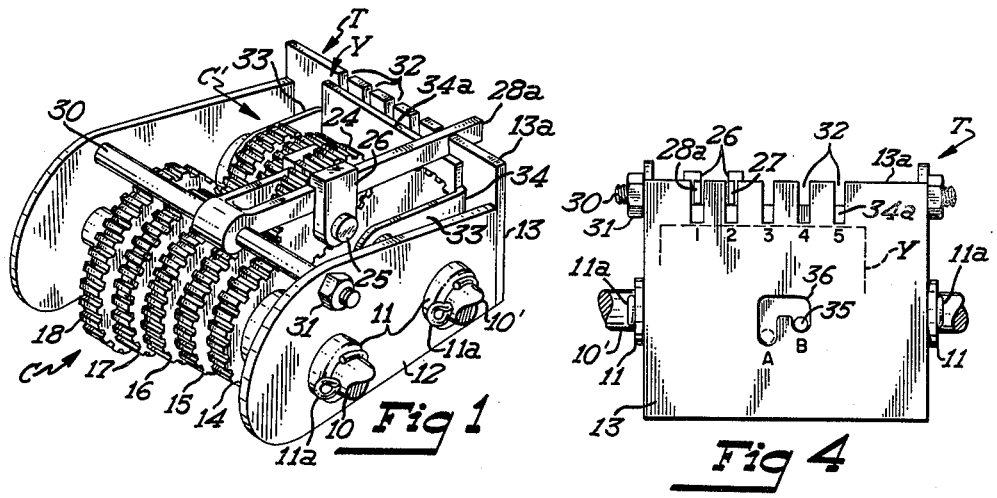
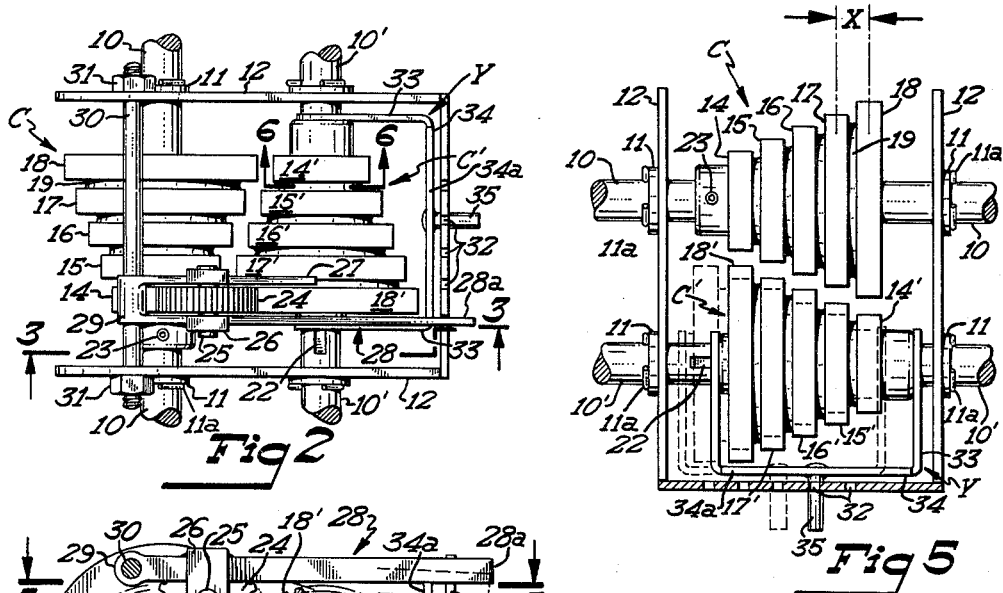
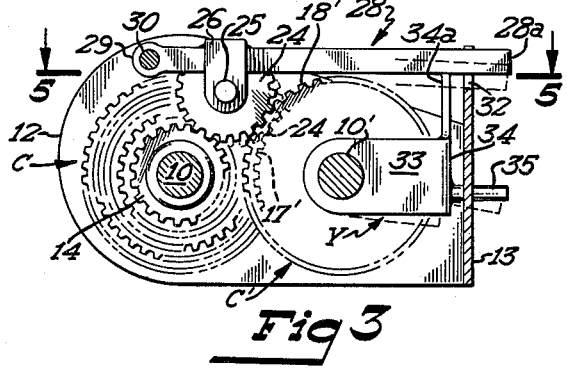
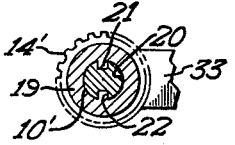
INVENTOR.
JOHN D. KIRSCHMANN
BY
Williamson & Palmatier
ATTORNEYS

United States Patent Office 3,209,609
Patented Oct. 5, 1965

3,209,609
TRANSMISSION
John D. Kirschmann, 209 W. Owens, Bismarck, N. Dak.
Filed June 25, 1963, Ser. No. 290,416
2 Claims. (Cl. 74—349)

This invention relates generally to transmission systems, and more particularly to a novel variable speed transmission system.

The transmission of this invention is particularly applicable to material distributing equipment of the general type disclosed in my prior Patents 2,804,998 and 2,819,-826, although the scope of the invention is not necessarily limited thereto, said transmission being applicable to any drive system where it is desirable to control and selectively vary the speed of the driven component by means of a variable speed transmission interconnecting the source of power with said driven component.

The material distributing equipment of my aforementioned patents includes a hopper having an elongate trough formed in the bottom thereof, said trough having a plurality of discharge openings therein, and a feed auger rotatably mounted in said trough for receiving material from said hopper and delivering or conveying same to the discharge openings in a regulated manner whereby the material is distributed under controlled conditions.

In material distributing equipment of this type, it is frequently necessary or desirable to drive the feed or distributing element at different speeds according to the particular material which is being dispensed, and also according to the rate or density of distribution desired. Also, by providing means for selectively varying the speed of the distributing element, the range of use of a single material distributing machine can be materially extended and expanded to enable considerably more different types of material to be distributed thereby than would be the case if the distributing element could be driven at only one speed.

An object of this invention is to provide a novel highly efficient multiple speed transmission which is relatively simple and inexpensive in construction, can be readily installed in any new or existing drive system, and which is readily and simply operated so that the driven element can be driven at a number of different speeds and so that the speed can be changed quickly and easily, and which will provide the aforementioned advantages when applied to material distributing equipment.

Another object is to provide a novel highly efficient transmission which enables the speed of the driven or distributing element to be selectively varied independently of the speed of the driving means or source of power; which enables the driven element to be selectively driven at speeds which are faster, slower, or the same as the speed of the driving means; which enables a driven element to be driven at different speeds by driving means operating at a constant rate of speed; and which enables the rate of speed of the driven element to be adjusted to changes in the speed of the driving means.

Still another object is to provide a novel variable speed transmission which includes a driven and a driving shaft, a series or cluster of different sized gears mounted on each of said shafts, the series or clusters of gears on said shafts combining to provide a plurality of cooperating pairs of gears, each of said pairs having a different gear ratio therebetween than the other of said pairs to enable the driven shaft to be driven at different speeds and also including shiftable means for selectively drivingly interconnecting any of said cooperating pairs of gears to drive the driven shaft at the desired speed.

A still further object is to provide a transmission of the type hereinabove described in which the gears on said shafts are selectively shiftable relative to each other to provide additional different combinations of cooperating pairs of gears to thereby increase the number of different speeds capable of being provided by said transmission.

These and other objects and advantages of my invention will more fully appear from the following description made in connection with the accompanying drawings wherein like reference characters refer to the same or similar parts throughout the several views, and in which:

FIG. 1 is a perspective view of one preferred embodiment of the transmission of this inventon;

FIG. 2 is a top plan view of FIG. 1;

FIG. 3 is a sectional view taken approximately on the lines 3—3 of FIG. 2;

FIG. 4 is a front elevational view;

FIG. 5 is a sectional view taken approximately on the line 5—5 of FIG. 3; and

FIG. 6 is a sectional view taken along the line 6—6 of FIG. 2.

Referring to the drawings, a complete transmission unit or assembly T is illustrated which includes a pair of rotatable shafts 10 and 10' which are arranged in laterally spaced apart parallel relationship, one of the shafts serving as the driven shaft and the other serving as the driving shaft, it being understood that the shafts 10 and 10' may be interchangeably used as the driven or driving shaft depending upon circumstances and the particular manner of use. A supporting frame is provided which includes opposed parallel side frame members 12 and a front frame member 13 extending between and rigidly connected to said side members.

The shafts 10 and 10' extend between the side members 12 and pass through suitable openings provided therein whereby the shafts are free to rotate about their axis relative to said side members. The shafts also extend laterally outwardly of said side members, and are held against longitudinal axial shifting movements by means of washers 11 and cotter pins 11a.

Each of the shafts 10 and 10' is provided with a plurality or cluster of different sized gears which are co-axially mounted thereon and drivingly connected thereto, the gears on shaft 10 being identified as gears 14 to 18 inclusive, and those on shaft 10' being identified as 14' to 18' inclusive. The gears on each shaft are arranged in series longitudinally thereof, and are of progressively increasing (or decreasing) size in their respective serial arrangements. The gears on one shaft progressively decrease in size in a direction opposite to the direction of progressive decrease in size of the gears on the other shaft. In short, each series of gears is reversely arranged or mounted on its respective shaft relative to the series of gears on the other shaft.

Gears on one shaft are opposed by and in substantially co-planar relationship or alignment with gears on the other shaft to provide a plurality of cooperating pairs of gears, each of said pairs providing a different gear ratio therebetween to effect the different speeds desired.

When the gears are arranged as shown in FIG. 2, and in the solid line positions of FIG. 5, each of the gears on one shaft are opposed by, aligned with, and adapted to cooperate with a gear on the other shaft, and provide five cooperating pairs of gears 14–18', 15–17', 16–16', 17–15' and 18–14'. Because of the reverse arrangement of the gears on their respective shafts, the smallest gear in each series cooperates with the largest gear in the opposing series, the second smallest gear cooperates with the second largest gear, and so on, thereby providing a succession of progressively increasing (or decreasing) speeds.

The gears 14 to 18 and 14' to 18' inclusive may be of any size desired to achieve the gear and speed ratio desired between each pair of opposing gears. In the illustrated embodiment, the gears identified by the same number are of the same size, that is, gears 14 and 14′ are identical, gears 15 and 15′ are identical, etc.

The gears are not only progressively sized, but are also preferably uniformly sized, as illustrated. That is, the gears in each series are of uniformly increasing (or decreasing) size. The uniform sizing provides uniform gapping or spacing between each cooperating pair of gears, to facilitate the interconnection of all of these pairs of gears by a single intermediate transmitting gear. Thus, the aforementioned cooperating pairs of gears shown in FIG. 2 are equidistant from each other.

In the illustrated embodiment, each gear cluster is of integral formation whereby each of the gears is integrally connected with the gear next adjacent thereto by an intermediate portion 19. In order to drivingly connect each of the gear clusters to their respective shafts and prevent relative rotational movement therebetween, each cluster is provided with an axial bore 20 having a pair of internal longitudinally extending keys 21 formed therein which seat in and engage corresponding complementary grooves 22 formed in each of the shafts 10 and 10′. However, it will be understood that the gears may be formed and mounted on their respective shafts in any suitable fashion which will accomplish the intended purpose of this invention.

In the illustrated embodiment, one of the gear clusters C is held against longitudinal movement on its shaft 10 by any suitable means such as the set screw 23 carried by the cluster C and adapted to engage the shaft 10. The other gear cluster C′ is free to slide longitudinally of its shaft 10′ to permit selective shifting thereof to different operational positions to increase the number of different speeds capable of being provided by the transmission in a manner hereinafter to be described, the cluster C′ being shifted between and held in these different operational positions in a manner hereinafter to be described.

In order to transmit the driving power from one shaft or cluster to another, an intermediate power transmitting gear 24 is provided, which is adapted to freely rest upon and between and simultaneously engage the opposed cooperating gears of any of the cooperating pairs provided on adjacent shafts whereby the intermediate gear 24 is driven by the gear of one cluster and drives the gear of the other cluster with which it is engaged. The gear 24 is shown engaged with the gears 14 and 18′. However, it will be understood that gear 24 is capable of being selectively shifted into engagement with any of the other cooperating pairs of gears by means hereinafter described.

The gear 24 is rotatably mounted on a stub shaft 25, which shaft in turn is supported by a pair of brackets 26 which are slidably mounted on a shiftable supporting means or lever which includes the elongate arms 27 and 28, which arms 27 and 28 are interconnected by and rigidly secured to a collar 29 which is slidably and rotatably mounted on an elongate supporting shaft 30, said shaft 30 extending between and being supported by the side frame members 12 and removably fastened thereto by means of the nuts 31. It will be noted that the arm 28 is substantially longer than the arm 27, and the front end 28a thereof serves as a handle for sliding the collar 29 on the shaft 30 and thereby selectively moving the intermediate gear 24 between the various pairs of cooperating gears. The brackets 26 are slidably mounted on their respective arms 27 and 28 whereby the brackets 26 and the gear 24 carried thereby can freely slide longitudinally of these arms and transversely of the shafts 10 and 10′ in order that the gear 24 can shift its position transversely of the shafts 10 and 10′ to be properly positioned between whichever pair of cooperating gears it is intended to work with.

The upper edge portion of the front frame panel 13 is provided with a series of vertically disposed slots 32 which communicate with the top marginal edge portion of the panel 12 and correspond in number to the maximum number of cooperating pairs of gears which are provided on the driven and driving shaft. The slots are preferably identified by suitable indicia such as the numerals 1, 2, 3, 4 and 5 illustrated. The slots 32 are of a size which permits the reception therein of the handle 28a so as to properly position and hold the gear 24 with respect to the pair of driving and driven gears on the shafts 10 and 10′, which it is to engage. Thus, when the gears are positioned as in FIG. 2, slot 1 positions gear 24 for engagement with gears 14 and 18′, slot 2 positions gear 24 for engagement with gears 15 and 17′, etc.

Thus, to obtain a particular speed, the gear 24 is raised and swung upwardly out of engagement with the gear clusters C and C′ by lifting the handle 28a and is then shifted longitudinally of the shafts 10 and 10′ by manipulation of said handle and sliding of collar 29 on shaft 30 until gear 24 is aligned with the pair of gears with which it is to cooperate, whereupon the gear 24 is lowered into engagement with said gears by lowering said handle and seating same in one of the slots 32. Because the gear 24 is free to shift transversely of the gear clusters, it will automatically shift its transverse position as it is lowered into engagement with the gear clusters and properly position itself between the two gears to be engaged thereby. The gear 24 can be maintained in a raised neutral disengaged condition by resting the handle 28a on the upper marginal edge 13a of the front panel 13.

It will be recognized that the arrangement illustrated in FIG. 2 with each gear on one of the shafts 10–10′ being in opposed relationship to a gear on the other shaft provides a five speed drive system, each of the opposed cooperating pairs of gears providing a different speed for the driven member.

In order to provide for more speeds than the five shown in FIG. 2, without having to provide additional pairs of gears on the driving and driven shafts, I provide for the selective shifting of the gears on one of the shafts 10–10′ relative to those on the other shaft whereby the gears on said shafts can be so arranged as to cooperate with more than one of the gears on the other of the shafts and to provide different combinations of gears which provide the additional speed desired. In the illustrated embodiment, this gear shifting is accomplished by simply shifting one of the gear clusters C′ longitudinally of its shaft and relative to the other gear cluster C. Thus, by simply shifting one of the gear clusters on one of the shafts, the number of different speed ratios which can be provided is substantially increased.

In order to accomplish this increase in the number of speed ratios and the shifting of the gear clusters relative to each other, a shifting yoke Y is provided which includes a pair of arms 33 which are slidably and rotatably mounted on the shaft 10′ and which engage the ends of gear cluster C′ and encloses and holds cluster C′ therebetween.

The yoke arms 33 are interconnected by means of the yoke member 34, which member has operatively connected thereto and extending laterally outwardly therefrom an operating handle or gear shift 35. An inverted generally U-shaped opening 36 having legs or slots of unequal length is provided in the front panel 13 for receiving the handle 35 and holding said handle and gear cluster C′ in a selected operational position. For convenience of identification, the legs of the opening 36 are provided with suitable indicia such as A and B in the illustrated embodiment. Slot A is longer and lower than slot B for reasons which are set forth in more detail hereinafter.

The yoke Y is adapted to shift the cluster C′ between the solid and broken line positions of FIG. 5. During each shift of cluster C′, cluster C′ and each gear carried thereon is moved axially of shaft 10′ a distance corresponding to the axial distance $x$ between the centers of any two adjacent gears. Since the clusters C and C' are of identical design, and the gears thereof are uniformly spaced apart, each shift of cluster C' moves the gears carried thereon to the position previously occupied by the next adjacent gear on the side of the direction of shifting movement. Thus, when gear shift handle 35 is installed in slot A, and cluster C' occupies the broken line position of FIG. 5, gear 14' is cooperatively aligned with gear 17, gear 15' with gear 16, gear 16' with gear 15, gear 17' with gear 14 and gears 18 and 18' occupy inoperative positions. Thus, the broken line or A position of FIG. 5 provides four cooperating pairs of gears which provide four gear and speed ratios which are different from each other and from those provided by the solid line or B position of FIG. 5. It is, of course, understood that intermediate gear 24 functions in the manner hereinbefore described, regardless of when cluster C' is in the A or B position.

Thus, the shifting yoke Y is designed to shift the gear cluster C' on its shaft 10' by merely shifting the gear shift handle 35 between the slots A and B in the panel 13, and by so doing, a total of nine different speeds can be provided, five speeds being provided by the B setting in which all five gears on each of the shafts 10 and 10' are in opposition to the gears on the opposing shaft, plus the additional four speeds provided by shifting the handle 35 to the A setting.

When gear cluster C' is shifted to the broken line position (A setting) or FIG. 5, the distance between the cooperating pairs of gears is greater than when cluster C' is in the solid line (B setting) of FIG. 5. To obtain maximum efficiency of operation and effect the proper engagement of the intermediate gear 24 with the gears on the gear clusters, the gear 24 should be in a lower operative position when cluster C' is in the A position than when in the B position. Therefore, I provide for adjusting the elevation of the gear 24 in the following manner.

The member 34 of the yoke Y is provided with an upstanding panel portion 34a which serves as a rest or stop for the handle 28a which rests thereon and is supported thereby when the gear shift handle 35 is in the B setting, as shown by the solid line positions of FIGS. 1, 3 and 4. In this situation, it will be noted that the handle 28a does not descend to the bottom of the slots 32, but is held in a raised position in said slots by yoke panel 34a so as to occupy substantially the upper half of said slots. To provide for a lowering of the intermediate gear 23 when the gear cluster C' is shifted to the A setting, the slot A is longer and lower than slot B. Thus, when the handle 35 is shifted from slot B to slot A, the yoke Y swings downwardly and the rest panel 34a of the yoke is thereby lowered, and thereby effects a corresponding lowering of the handle 28a and the gear 24 mounted thereon to the desired lower position for the shifted A setting. The lowered positions of the gear 24, handle 28a and yoke Y are shown in broken line in FIGS. 3 and 4. It will be seen from the broken line positions of FIGS. 3 and 4 that the handle 28a rests on the bottom of the slots 32 in the A setting. In FIG. 3, the gear 24 is shown in broken line position in engagement with gears 14 and 17'.

If shaft 10' is the driven shaft in the illustrated embodiment, it is apparent that when cluster C' is in the B setting as shown in FIG. 2 that cooperating gears 14–18' provide the fastest speed and that the succeeding pairs of cooperating gears provide progressively reduced speeds until the slowest speed is reached by the cooperating gears 14'–18. It is further apparent that by shifting cluster C' to the A setting that another progressive range of speeds is provided which are within but different from the range of speeds provided by the B setting. In the B setting, gears 14–17' provide the fastest speed with the speed progressively reducing the slowest speed of the B setting provided by the gears 14'–17.

The source of power for the illustrated transmission unit and the mechanism to be driven by said transmission have not been illustrated since the illustration thereof is not considered necessary to the complete understanding of the novel transmission disclosed herein. However, when the transmission of this invention is utilized with material distributing equipment such as that mentioned hereinbefore, the driven shaft of the transmission is operatively and drivingly connected by any suitable means to the distributing element such as the feed auger of the distributors of my aforementioned patents. The driving shaft of the transmission may be operatively connected to any suitable source of power by any suitable means. When the transmission is utilized in the material distributing equipment of my patents, the driving shaft of the transmission may be operatively connected to the ground or traction wheels of the distributor so as to be powered by the movement thereof. However, the driving shaft may be powered by some other means such as by the motor or by connection with the power take-off of a tractor.

It will also be understood that when the illustrated transmission is used in a material distributor which is intended to be used to distribute a larger number of different kinds or type of material, the proper settings for handles 28a and 35 are predetermined in accordance with the type of material and the various rates of distribution desired with suitable instructions being provided for the operator to enable him to readily adjust the transmission to the particular circumstances.

Relating the various speeds to the slot identification, it will be apparent that, when shaft 10' is the driving shaft, slot 1 represents the fastest speed and slot 5 the slowest speed, with the speeds progressively reducing between slots 1 and 5 in the B setting. In the A setting, the speeds are progressively reduced from slot 1 to slot 4 inclusive, slot 5 being an inoperative position in the A setting.

In operation, the handle 35 is simply seated in the slot A or B and the handle 28a is set in one of the slots 1 to 5 inclusive to provide the desired speed. As soon as the latter is accomplished, the gear 24 is in cooperative engagement with a pair of cooperating adjacent gears on the shafts 10 and 10' whereby the power from one of the shafts 10 or 10' (whichever is the driven shaft) is transmitted to the other of said shafts which in turn drives the mechanism intended to be driven by the transmission through suitable means (not shown), at the speed provided by the gear ratio of the particular pair of gears engaged by the gear 24.

From the foregoing, the advantages of this invention are readily apparent. It can be seen that I have provided a novel transmission which provides a mutliplicity of different speeds and which can be very simply manipulated or adjusted to obtain any speed desired. It will also be apparent that my transmission enables a maximum number of speeds to be provided with a minimum number of parts and which can be constructed in very compact fashion so as to occupy a minimum of space for ease and convenience of installation.

It will also be understood that the invention is not limited to the precise embodiment shown and that numerous variations thereof can be made within the scope of this invention. Thus, for example, a greater or lesser number of gears may be provided on each of the shafts 10 and 10'. Also, provision may be made for more than two shift positions of the gear cluster C' to provide even more speeds than those illustrated.

It will, of course, be understood that various changes may be made in the form, details, arrangement and proportions of the various parts without departing from the scope of my invention.

What I claim is:

1. A transmission system comprising a pair of horizontal parallel rotatable shafts, a series of gears coaxially mounted on each of said shafts in driving engagement therewith, said series of gears being in opposed spaced apart relationship, one of said series of gears being shiftable on its shaft between a first and second operating positions with respect to the other series of gears, said series of gears providing cooperating pairs of gears in each of said positions, the cooperating pairs of each position providing different speed ratios between said shafts than the speed ratios provided by the cooperating pairs of the other positions, a transmitting gear capable of resting atop and selectively operatively engaging each of said cooperating pairs of gears to transmit power therebetween, said transmitting gear being mounted on an elongated operating lever and capable of movement longitudinally thereof, said lever extending transversely of said shafts, means supporting said lever for pivotal and axial movement with respect to an axis paralleling said shafts, said transmitting gear being raised and lowered into and out of operative engagement with each cooperating pair of gears by vertical swinging movement of said lever about said axis, said transmitting gear being movable between cooperating pairs of gears by movement of said lever longitudinally of said axis, structure having a plurality of vertically disposed slots formed therein arranged in series longitudinally of said shafts, a slot being provided for each cooperating pair of gears, said slots being adapted to releasably receive said lever and hold same against longitudinal movement with respect to said axis and thereby position the transmitting gear for operative engagement with the cooperating pair of gears corresponding to said slot, shift means operatively connected to the shiftable series of gears for shifting said series of gears between said operating positions, said shift means including an operating handle and adapted for vertical swinging movement and for movement longitudinally of said shafts, structure having a pair of handle receiving openings formed therein corresponding to the operating positions, said handle being held against longitudinal movement with respect to said shafts when seated in said openings and when so held holds the shiftable series of gears in the operating position corresponding to the opening in which said handle is seated, the bottoms of said openings being at different elevations whereby said handle is held at different elevations when seated in said openings, and rest means carried by said shift means and adapted to engage said lever and hold same at a given elevation when said handle is seated in the highest of said openings, and further adapted to be lowered by movement of said handle to the lower of said openings to permit said lever to assume a position lower than said given elevation when said handle is seated in the lower opening.

2. A transmission system comprising a pair of parallel rotatable shafts, a series of gears co-axially mounted on each of said shafts in driving engagement therewith, said series being in opposed spaced apart relationship and providing a plurality of cooperating pairs of gears which provide a plurality of different speed ratios between said shafts, a transmitting gear capable of selectively operatively engaging each of said cooperating pairs of gears to transmit driving power therebetween and between said shafts, an elongate operating lever for said transmitting gear extending transversely of said shafts, said transmitting gear being mounted on said lever and capable of movement longitudinally thereof and transversely of said shafts, means supporting said handle for pivotal and axial movement with respect to an axis paralleling said shafts whereby said transmitting gear is moved into and out of engagement with each cooperating pair of gears by pivotal movement of said lever about said axis and whereby said transmitting gear is moved from one cooperating pair of gears to another by movement of said lever longitudinally of said axis, and lever positioning means for each cooperating pair of gears, each of said positioning means being adapted to releasably engage and hold said lever against movement longitudinally of said axis in a position in which the transmitting gear is operatively engaged with the cooperating pair of gears for which said positioning means is provided, and wherein one of said series of gears is shiftable longitudinally of its shaft, and shift means for shifting the shiftable series of gears between a plurality of operative positions, with respect to the other series of gears, said series of gears providing cooperating pairs of gears in each of said positions, the cooperating pairs of each position providing different speed ratios between said shafts than the speed ratios provided by the cooperating pairs of the other positions, said shift means including yoke means having spaced apart interconnected arms slidably mounted on the same shaft as the shiftable series of gears, said arms enclosing said shiftable series of gears therebetween and adapted to shift said shiftable series of gears on its shaft when said arms are slid longitudinally of the same shaft, said yoke also including an operating handle for effecting said shifting movement, and handle positioning means for each of said operative positions, adapted to releasably hold said handle, yoke and the shiftable series of gears controlled thereby against said shifting movement in each of said operative positions.

References Cited by the Examiner
UNITED STATES PATENTS

| | | | |
|---|---|---|---|
| 295,536 | 3/84 | Gallup | 74—349 |
| 807,104 | 12/05 | Anderson | 74—349 |
| 1,156,883 | 10/15 | Bubb | 74—349 |
| 1,438,307 | 12/22 | Hopper | 74—349 |
| 1,481,486 | 1/24 | Sundstrand | 74—349 |
| 2,820,371 | 1/58 | Weerts | 74—349 |

DON A. WAITE, *Primary Examiner.*